US008676264B2

(12) United States Patent
Yao et al.

(10) Patent No.: US 8,676,264 B2
(45) Date of Patent: Mar. 18, 2014

(54) METHOD AND APPARATUS FOR POWER SHARING AMONG MULTI-CARRIER MODULES OF A MULTI-CARRIER BASE STATION

(75) Inventors: Guoqiang Yao, Shanghai (CN); Jiang Guo, Shanghai (CN); Baomin Li, Xi'an (CN); Yingjiu Xia, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/353,056

(22) Filed: Jan. 18, 2012

(65) Prior Publication Data

US 2012/0115547 A1      May 10, 2012

Related U.S. Application Data

(63) Continuation of application No. PCT/CN2010/075518, filed on Jul. 28, 2010.

(30) Foreign Application Priority Data

Jul. 28, 2009    (CN) .......................... 2009 1 0152052

(51) Int. Cl.
    *H04W 88/08*    (2009.01)
(52) U.S. Cl.
    USPC ........ 455/561; 455/522; 455/444; 455/452.2; 370/329; 370/331
(58) Field of Classification Search
    USPC ........ 455/561, 522, 444, 452.2; 370/329, 331
    See application file for complete search history.

(56) References Cited

U.S. PATENT DOCUMENTS

| 6,307,849 B1 | 10/2001 | Tiedemann, Jr. |
| 6,542,482 B1 * | 4/2003 | Johansson et al. ............ 370/331 |
| 6,584,330 B1 * | 6/2003 | Ruuska ........................ 455/574 |
| 6,650,876 B1 | 11/2003 | Ostman et al. |

(Continued)

FOREIGN PATENT DOCUMENTS

| CN | 1773919 A | 5/2006 |
| CN | 1964208 A | 5/2007 |

(Continued)

OTHER PUBLICATIONS

Supplementary European Search Report received in European Application No. 10803910.8, mailed Apr. 4, 2012, 8 pages.

(Continued)

*Primary Examiner* — Jinsong Hu
*Assistant Examiner* — Jean Chang
(74) *Attorney, Agent, or Firm* — Slater & Matsil, L.L.P.

(57) ABSTRACT

A carrier processing method, a communication device and a communication system are provided according to the embodiments of the present invention. The method includes: acquiring control information of each multi-carrier module associated with carriers; according to the acquired control information, determining a carrier used by each multi-carrier module; and performing processing by each multi-carrier module according to the determined carrier. The communication device includes: a processing unit, configured to acquire control information of each multi-carrier module associated with carriers, and according to the acquired control information, determine a carrier used by each multi-carrier module; and a notification unit, configured to instruct each multi-carrier module to perform processing according to the determined carrier. The technical solutions provided in the embodiments of the present invention enable at least two multi-carrier modules to cooperatively implement processing.

18 Claims, 5 Drawing Sheets

(56) References Cited

U.S. PATENT DOCUMENTS

| | | | |
|---|---|---|---|
| 6,694,148 B1* | 2/2004 | Frodigh et al. | 455/522 |
| 6,957,087 B1* | 10/2005 | Hedberg | 455/561 |
| 7,769,405 B2* | 8/2010 | Shurvinton | 455/522 |
| 8,023,951 B2* | 9/2011 | Mattila | 455/444 |
| 8,036,676 B2* | 10/2011 | Okazaki | 455/454 |
| 8,086,258 B2* | 12/2011 | Fujii et al. | 455/522 |
| 2003/0069035 A1* | 4/2003 | Shurvinton | 455/522 |
| 2007/0026886 A1* | 2/2007 | Vincent | 455/522 |
| 2008/0070585 A1* | 3/2008 | Wu et al. | 455/452.2 |
| 2008/0161031 A1* | 7/2008 | Tu | 455/512 |
| 2008/0188256 A1* | 8/2008 | Wu et al. | 455/522 |
| 2008/0254745 A1* | 10/2008 | Zhang et al. | 455/41.2 |
| 2009/0325623 A1* | 12/2009 | Morita et al. | 455/522 |
| 2010/0111023 A1* | 5/2010 | Pelletier et al. | 370/329 |
| 2011/0111788 A1* | 5/2011 | Damnjanovic et al. | 455/522 |
| 2011/0269405 A1* | 11/2011 | Bjorken | 455/67.11 |
| 2011/0275405 A1* | 11/2011 | Backman et al. | 455/522 |
| 2012/0071196 A1* | 3/2012 | Bergman | 455/522 |

FOREIGN PATENT DOCUMENTS

| | | |
|---|---|---|
| CN | 101022298 A | 8/2007 |
| CN | 101242664 A | 8/2008 |
| CN | 101350640 A | 1/2009 |
| CN | 101378275 A | 3/2009 |
| EP | 1793509 A1 | 6/2007 |
| EP | 2237626 A1 | 10/2010 |
| EP | 2337233 A1 | 6/2011 |
| WO | WO 01/91446 A2 | 11/2001 |
| WO | WO 2008/013286 A1 | 1/2008 |
| WO | WO 2008/040229 A1 | 4/2008 |
| WO | WO 2008/124796 A1 | 10/2008 |

OTHER PUBLICATIONS

International Search Report and Translation received in the Patent Cooperation Treaty Application No. PCT/CN2010/075518, mailed Nov. 25, 2010, 6 pages.

Written Opinion of the International Searching Authority and Translation received in Patent Cooperation Treaty Application No. PCT/CN2010/075518, mailed Nov. 25, 2010, 14 pages.

1st Chinese Office Action regarding Chinese Application No. 200910152052.X, with Partial Translation, dated Jul. 3, 2012, 9 pages.

Decision on Grant in RU Applicaiton No. 2011154180, dated Sep. 9, 2013, 25 pages.

* cited by examiner

METHOD AND APPARATUS FOR POWER SHARING AMONG MULTI-CARRIER MODULES OF A MULTI-CARRIER BASE STATION

This application is a continuation of International Application No. PCT/CN2010/075518, filed on Jul. 28, 2010, which claims priority to Chinese Patent Application No. 200910152052.X, filed on Jul. 28, 2009, both of which are hereby incorporated by reference in their entireties.

TECHNICAL FIELD

The present invention relates to the field of communications technologies, and in particular, to a carrier processing method, a communication device and a communication system.

BACKGROUND

With the development of wireless communications technologies, multi-carrier technologies are more and more widely used in communication systems such as a global system for mobile communications (GSM, Global System for Mobile Communications). For a multi-carrier base station, it needs to share the output power of the carriers, expand the coverage of the carriers of the multi-carrier base station, and reduce the network construction cost.

In the prior art, multi-carrier modules are configured for cells in the multi-carrier base station, and the power of carriers is shared in the transmission channels of a single multi-carrier module, which mainly includes: based on the characteristic that the carriers in the downstream channels of the multi-carrier module require different output power when a downlink power control function and a downstream discontinuous transmission function of the network are started, dynamically allocating the output power on different carriers, thereby expanding the coverage of the carriers in the multi-carrier base station, and reducing the network construction cost.

However, the prior art only provides a method of sharing the power of the carriers in a single multi-carrier module, but does not provide a method of enabling two or more multi-carrier modules to cooperatively implement carrier processing, for example, power sharing of the carriers.

SUMMARY OF THE INVENTION

Embodiments of the present invention provide a carrier processing method, a communication device and a communication system that enable at least two multi-carrier modules to cooperatively implement processing.

An embodiment of the present invention provides a carrier processing method, which includes acquiring control information of each multi-carrier module associated with carriers; according to the acquired control information, determining a carrier used by each multi-carrier module; and performing processing by the each multi-carrier module according to the determined carrier.

An embodiment of the present invention provides a communication device, which includes a processing unit, configured to acquire control information of each multi-carrier module associated with carriers; and according to the acquired control information, determine a carrier used by each multi-carrier module; and a notification unit, configured to instruct each multi-carrier module to perform processing according to the determined carrier.

An embodiment of the present invention provides a communication system, which includes a first apparatus, configured to acquire control information of each multi-carrier module associated with carriers; and according to the acquired control information, determine a carrier used by each multi-carrier module; and a second apparatus, configured to perform transmission according to the carrier determined by the first apparatus, where the number of the second apparatus is one or more.

It can be seen from the foregoing technical solutions that, in the embodiments of the present invention, the control information of each multi-carrier module associated with the carriers is acquired; according to the acquired control information, the carrier used by each multi-carrier module is determined; and each multi-carrier module performs processing according to the determined carrier, so that a method of enabling at least two multi-carrier modules to cooperatively implement carrier processing is provided.

DETAILED DESCRIPTION OF ILLUSTRATIVE EMBODIMENTS

Embodiments of the present invention provide a carrier processing method, a communication device and a communication system that enable at least two multi-carrier modules to cooperatively implement processing (for example, power sharing of carriers). Details are illustrated in the following.

Figure 1:
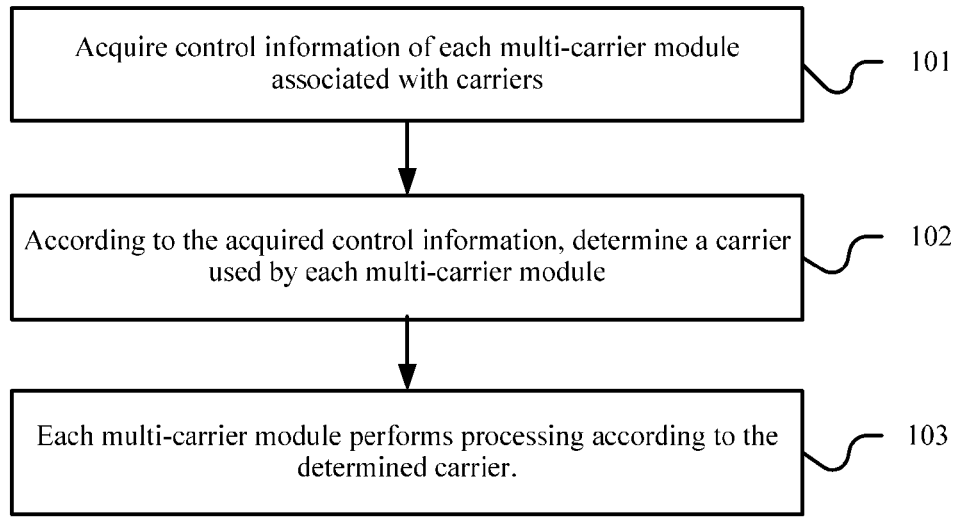
FIG. 1 is a flow chart of a transmission resource processing method according to Embodiment 1 of the present invention.

FIG. 1 is a flow chart of a carrier processing method according to Embodiment 1 of the present invention, which mainly includes the following steps.

Step 101: Acquire control information of each multi-carrier module associated with carriers.

In this step, the acquiring the control information of each multi-carrier module associated with the carriers includes: acquiring, by one of multiple (more than two) multi-carrier modules that serves as a main multi-carrier module, the control information of each multi-carrier module associated with the carriers; or acquiring, by a resource pool module other than the multi-carrier modules, the control information of each multi-carrier module associated with the carriers.

The control information of each multi-carrier module associated with the carriers may be carrier control information of a multi-carrier module. The carrier control information of the multi-carrier module includes: power of a carrier, a working frequency point of the carrier, and a working frequency band of the multi-carrier module.

Step 102: According to the acquired control information, determine a carrier used by each multi-carrier module.

In this step, the determining the carrier used by each multi-carrier module according to the acquired control information may include:

determining a carrier having a working frequency point in an intersection of working frequency bands of at least two multi-carrier modules as a shared carrier;

determining power of a single multi-carrier module and total power of all multi-carrier modules in a cell;

when the power of the single multi-carrier module is greater than a first threshold, and the total power of all the multi-carrier modules in the cell is smaller than or equal to a second threshold, determining that the shared carrier in the single multi-carrier module is transmitted by another multi-carrier module having remaining power; and further determining that an exceeding part obtained through the power of the multi-carrier module minus the first threshold is provided by another multi-carrier module having remaining power; or when the power of the single multi-carrier module is greater than the first threshold, and the total power of all the multi-carrier modules in the cell is greater than the second threshold, starting peak clipping processing of the multi-carrier module; or when the power of the single multi-carrier module is smaller than or equal to the first threshold, determining that the single multi-carrier module transmits a carrier according to the control information of the carrier of the single multi-carrier module.

The first threshold is a threshold set according to the power of the single multi-carrier module, the threshold may be a maximum support power K1 of the multi-carrier module, and different multi-carrier modules may have different first thresholds. The second threshold is a threshold set according to the total power of all the multi-carrier modules in the cell, the threshold may be a maximum support power K2 of the cell, and apparently K2 is greater than K1.

Step 103: Each multi-carrier module performs processing according to the determined carrier.

It can be seen from Embodiment 1 that, in the embodiment of the present invention, the control information of each multi-carrier module associated with the carriers is acquired; according to the acquired control information, the carrier used by each multi-carrier module is determined; and according to the determined carrier, each multi-carrier module performs processing, for example, implements power sharing of the carriers, so that a method of enabling at least two multi-carrier modules to cooperatively implement carrier processing is provided.

Figure 2:
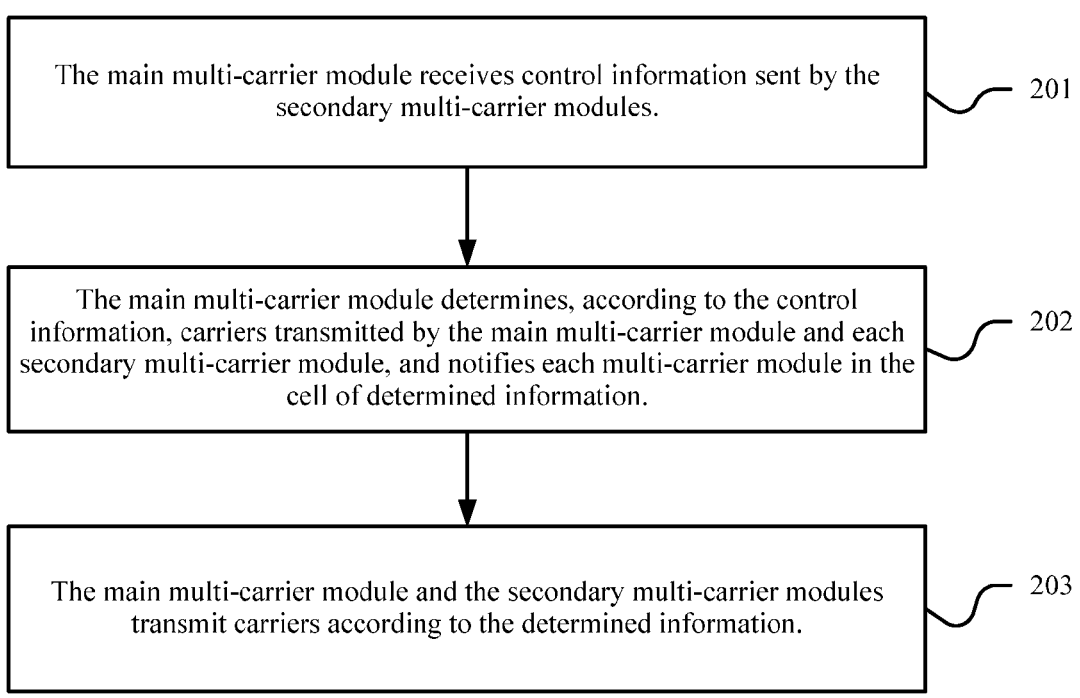
FIG. 2 is a flow chart of a transmission resource processing method according to Embodiment 2 of the present invention.

FIG. 2 is a flow chart of a carrier processing method according to Embodiment 2 of the present invention. In this embodiment, multi-carrier modules are divided into a main multi-carrier module and secondary multi-carrier modules. Referring to FIG. 2, the method mainly includes the following steps.

Step 201: The main multi-carrier module receives control information sent by the secondary multi-carrier modules.

Figure 3:
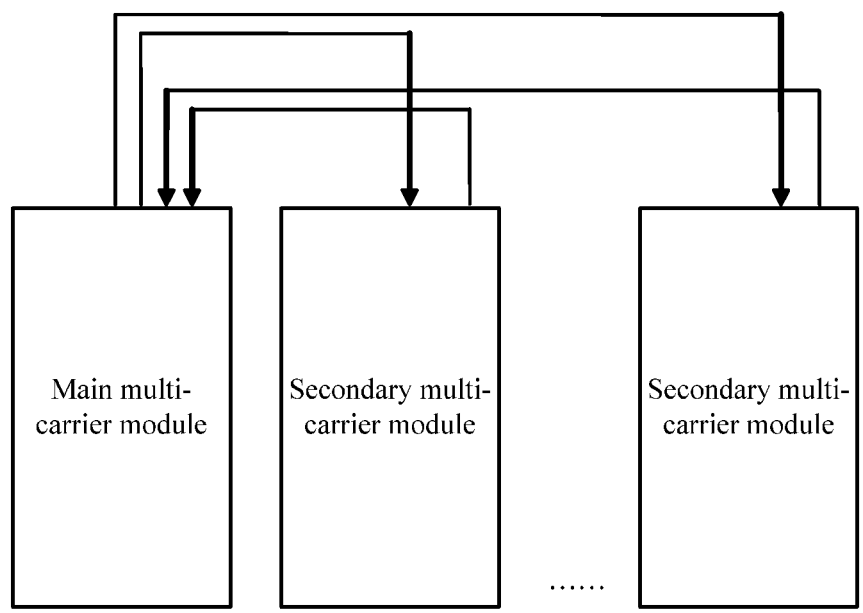
FIG. 3 is a schematic architectural diagram of a multi-carrier base station according to Embodiment 2 of the present invention.

In Embodiment 2, a multi-carrier base station configures multiple (more than two) multi-carrier modules for a cell, where one of the multi-carrier modules serves as the main multi-carrier module, and other multi-carrier modules except for the main multi-carrier module are the secondary multi-carrier modules. For details, reference is made to FIG. 3, and FIG. 3 is a schematic architectural diagram of a multi-carrier base station according to Embodiment 2 of the present invention.

The main multi-carrier module receives carrier control information of a multi-carrier module sent from each secondary multi-carrier module, where the carrier control information of the multi-carrier module at least includes power of a carrier, a working frequency point of the carrier, and a working frequency band of the multi-carrier module, and may further include a carrier number and a carrier frequency number. The carrier frequency number is corresponding to the multi-carrier module. The carrier control information may be used by the main multi-carrier module for calculating output power of each multi-carrier module, and for re-allocating carriers for the main multi-carrier module and the secondary multi-carrier modules. The allocating the carriers includes: determining properties of the carriers, such as output power of the carriers. Each secondary multi-carrier module may send control information of all carriers in the secondary multi-carrier modules to the main multi-carrier module via a data bus. It is easy to understand that, the control information of the carriers may include power of the carriers and working frequency points of the carriers, and the control information of the carriers may further include the carrier number and the carrier frequency number. The control information of the carriers may be actively sent by the secondary multi-carrier modules to the main multi-carrier module, or sent by the secondary multi-carrier modules according to a request from the main multi-carrier module.

Step 202: The main multi-carrier module determines, according to the control information, carriers transmitted by the main multi-carrier module and each secondary multi-carrier module, and notifies each secondary multi-carrier module in the cell of a carrier that is transmitted by each secondary multi-carrier module and is in determined information, where the determined information includes: the carrier transmitted by the main multi-carrier module and the carrier transmitted by each secondary multi-carrier module.

The main multi-carrier module receives the control information sent from the secondary multi-carrier modules, and performs related power and carrier allocation.

The main multi-carrier module determines output power of all carriers of the main multi-carrier module and the secondary multi-carrier modules according to the received control information, that is, the total output power of all the carriers in the cell, and determines the number of the multi-carrier modules in the cell and the number of the carriers in each multi-carrier module. For example, the main multi-carrier module sends N0 carriers, a secondary multi-carrier module 1 sends N1 carriers, and a secondary multi-carrier module 2 sends N2 carriers.

Step 203: The main multi-carrier module and the secondary multi-carrier modules transmit carriers according to the determined information.

After a working carrier of each multi-carrier module is determined in Step 202, the main multi-carrier module and the secondary multi-carrier modules transmit carriers according to the determined information, and transmit downstream data to an air interface.

Figure 4:
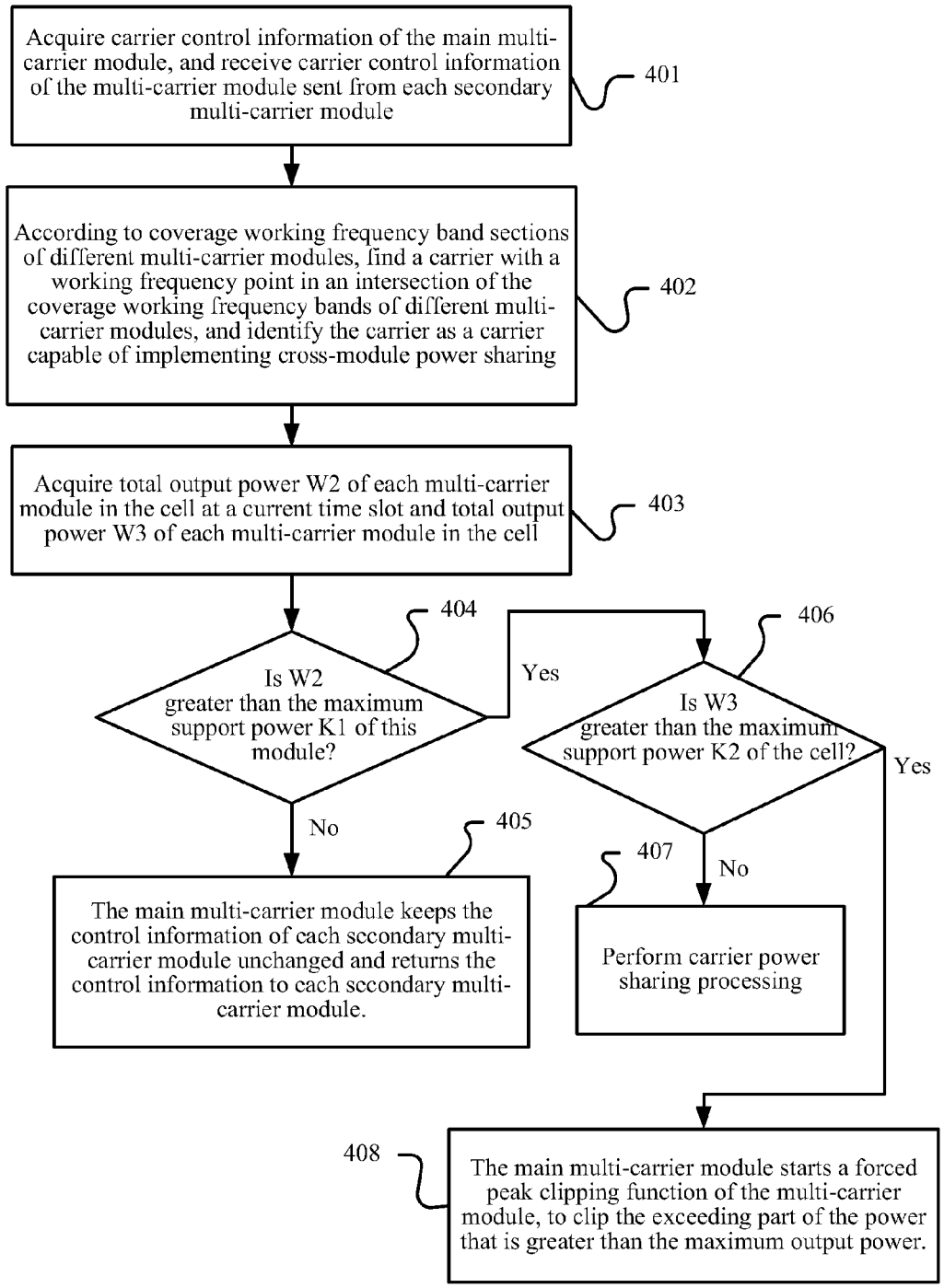
FIG. 4 is a flow chart of processing of a main multi-carrier module according to Embodiment 2 of the present invention.

FIG. 4 is a flow chart of power and carrier allocation processing implemented by the main multi-carrier module according to Embodiment 2 of the present invention, which mainly includes the following steps.

Step 401: Acquire carrier control information of the main multi-carrier module, and receive carrier control information of the multi-carrier module sent from each secondary multi-carrier module.

The carrier control information of the multi-carrier module at least includes power of a carrier, a working frequency point of the carrier, and a working frequency band of the multi-carrier module, and may further include a carrier number, a carrier frequency number and the like.

Step 402: According to coverage working frequency band sections of different multi-carrier modules, find a carrier with a working frequency point in an intersection of the coverage working frequency bands of different multi-carrier modules, where the carrier in the intersection may be a carrier capable of implementing cross-module power sharing.

Step 403: Acquire total output power W2 of each multi-carrier module in the cell at a current time slot and total output power W3 of each multi-carrier module in the cell.

Output power W1 of each carrier in the cell at the current time slot is determined first, the total output power W2 of each multi-carrier module in the cell at the current time slot may be determined according to the output power W1 of each carrier in the cell, and the total output power W3 of each multi-carrier module in the cell may be determined according to the output power W2 of each multi-carrier module. Alternatively, the total output power W3 of each multi-carrier module may be directly determined according to the output power W1 of each carrier in the cell.

Step 404: For each multi-carrier module, judge whether the total output power W2 at the current time slot is greater than the first threshold corresponding to the module, for example, the maximum support power K1, and if the total output power W2 is not greater than the first threshold, that is, the total output power W2 of any of the multi-carrier modules at the current time slot is smaller than or equal to the first threshold corresponding to the any of the multi-carrier modules, perform step 405; while if the total output power W2 is greater than the first threshold, that is, the total output power of at least one of the multi-carrier modules at the current time slot is greater than the first threshold corresponding to the multi-carrier module, perform step 406.

Step 405: The main multi-carrier module keeps the carrier control information of each secondary multi-carrier module unchanged and returns the carrier control information to each secondary multi-carrier module.

The keeping the carrier control information of each secondary multi-carrier module unchanged indicates that each secondary multi-carrier module may send downstream data via a carrier according to original carrier control information.

In addition, the carrier control information of the main multi-carrier module also remains unchanged, so that the main multi-carrier module may send downstream data via a carrier according to original carrier control information.

After the step is executed, the process ends.

Step 406: Judge whether the total output power W3 of each multi-carrier module in the cell is greater than the maximum support power K2 of the cell, and if the total output power W3 is not greater than the maximum support power K2, perform step 407; while if the total output power W3 is greater than the maximum support power K2, perform step 408.

Step 407: Perform carrier power sharing processing. After the step is executed, the process ends.

After it is judged that the total output power W3 of each multi-carrier module in the cell is not greater than (smaller than or equal to) the maximum support power K2 of the cell, the carrier power sharing processing may be performed.

Since the carrier capable of implementing cross-module power sharing has already been found in step 402, the main multi-carrier module may perform the carrier power sharing processing in the following manners.

In a first manner, timeslot-level carrier channel shift is performed on the shared carrier that is capable of implementing cross-module power sharing and is in the multi-carrier module satisfying that W2 is greater than K1 and the carrier having the output power smaller than the output power of the shared carrier in another multi-carrier module having remaining power, that is, the shared carrier in the multi-carrier module satisfying that W2 is greater than K1 is transmitted via a channel of another multi-carrier module having remaining power, and the carrier that has the output power smaller than the output power of the shared carrier and is in the multi-carrier module having remaining power is transmitted via a channel of the multi-carrier module satisfying that W2 is greater than K1. Taking an example for illustration that the carrier channel shift is performed on two multi-carrier modules, apparently, the shared carrier is in an intersection of working frequency bands of the two multi-carrier modules, and a shifted carrier having smaller output power is also in the intersection of the working frequency bands of the two multi-carrier modules.

Alternatively, the shared carrier that is capable of implementing cross-module power sharing and is in the multi-carrier module satisfying that W2 is greater than K1 is transmitted via an idle downstream carrier channel in another multi-carrier module having remaining power. For example, all or a part of the shared carrier are transmitted via the idle downstream carrier channel in another multi-carrier module having remaining power. Taking two multi-carrier modules as an example for illustration, apparently, at least one of the shared carriers is in an intersection of the working frequency bands of the two multi-carrier modules.

In a second manner, an exceeding part of the power obtained through W2 minus K1 in the multi-carrier module is provided by the carrier in another multi-carrier module having remaining power, that is, when transmission power of one multi-carrier module is inadequate, another multi-carrier module having remaining power uses the exceeding part of the power to transmit a part or all of data transmitted by the multi-carrier module with inadequate transmission power, so as to reduce the total output power of the multi-carrier module satisfying that W2 is greater than K1 at the current time slot, thereby meeting a requirement of the power of the transmission channel.

Step 408: The main multi-carrier module starts a forced peak clipping function of the multi-carrier module, to clip the exceeding part of the power that is greater than a maximum output power of the cell, so as to ensure reliable operation of a multi-carrier base station.

After it is judged that the total output power W3 of each multi-carrier module in the cell is greater than the maximum support power K2 of the cell, the forced peak clipping function of the multi-carrier module is started based on the carrier power sharing, to clip the exceeding part of the power that is greater than the maximum output power, so as to ensure reliable operation of the multi-carrier base station.

The above process is further illustrated by taking an example that each multi-carrier module includes a baseband processing unit, a baseband data exchange unit, and an intermediate radio frequency processing unit, and the following steps are specifically included.

1) The baseband processing unit of each secondary multi-carrier module may send, via a data bus, the control information of the secondary multi-carrier module to a baseband processing unit of the main multi-carrier module several time slots, for example, four time slots, ahead of a certain time point T0, where the control information at least includes power of a carrier, a working frequency point of the carrier, and a working frequency band of the multi-carrier module, and may further include a carrier number and a carrier frequency number.

2) The baseband processing unit of the main multi-carrier module receives the control information sent from the secondary multi-carrier module, and performs calculation of related power and carrier allocation several time slots ahead of the same time point T0. The above step takes an example that each secondary multi-carrier module sends the control information four time slots ahead, and the main multi-carrier module may perform related calculation three time slots ahead in this step.

3) After performing the calculation of related power and carrier allocation, the baseband processing unit of the main multi-carrier module notifies the baseband processing unit of each secondary multi-carrier module of a carrier that is transmitted by each secondary multi-carrier module and is in the determined information. The baseband processing unit of each secondary multi-carrier module may send downstream data of each carrier and control information of each carrier and the like to the baseband data exchange unit of the multi-carrier module two time slots ahead. The baseband processing unit of the main multi-carrier module may send downstream data and control information of each carrier to a baseband data exchange unit of the multi-carrier module two time slots ahead.

4) Intermediate radio frequency processing units in the main and secondary multi-carrier modules may acquire the downstream data and the control information of each carrier from baseband data exchange units of the main and secondary multi-carrier modules one time slot ahead respectively, and modulate and output the downstream data of each carrier via the carrier according to the control information.

It can be seen from Embodiment 2 that, in the embodiment of the present invention, the multi-carrier modules in the cell are divided into the main multi-carrier module and the secondary multi-carrier modules, and the main multi-carrier module receives the control information of the secondary multi-carrier module sent from each secondary multi-carrier module, to calculate output power of a power amplifier of each multi-carrier module according to the control information, and re-allocate carriers of the main multi-carrier module and the secondary multi-carrier modules, thereby enabling at least two multi-carrier modules to cooperatively implement cross-module power sharing processing, and enhancing performance of a network. In addition, for a large-capacity multi-carrier base station, the coverage of the base station may be expanded without increasing hardware cost, and network construction cost is reduced.

Figure 5:
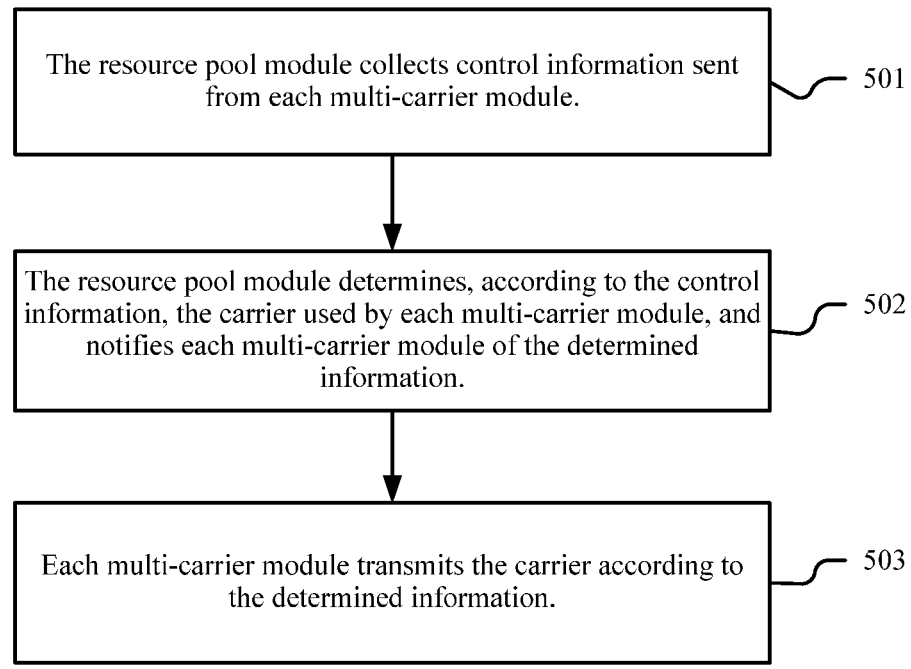
FIG. 5 is a flow chart of a transmission resource processing method according to Embodiment 3 of the present invention.

FIG. 5 is a flow chart of a transmission resource processing method according to Embodiment 3 of the present invention. In this embodiment, a multi-carrier base station is disposed with a resource pool module, and the resource pool module uniformly allocates carriers transmitted by multi-carrier modules. As shown in FIG. 5, the method mainly includes the following steps.

Step 501: The resource pool module collects control information sent from each multi-carrier module.

Figure 6:
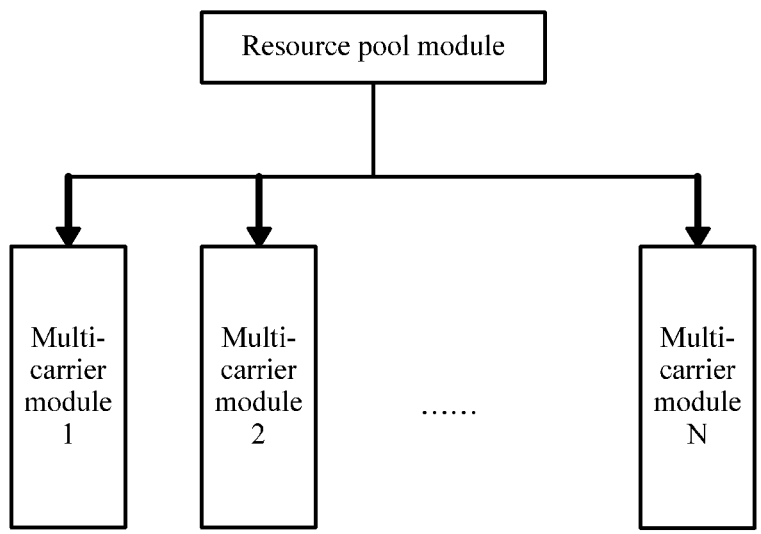
FIG. 6 is a schematic architectural diagram of a multi-carrier base station according to Embodiment 3 of the present invention.

In Embodiment 3, a resource pool module is set, and the resource pool module uniformly controls each multi-carrier module. Reference is made to FIG. 6 for details, and FIG. 6 is a schematic architectural diagram of a multi-carrier base station according to Embodiment 3 of the present invention.

This step is similar to step 201 in Embodiment 2, and the difference lies in that the resource pool module collects carrier control information of a multi-carrier module in a cell, where the carrier control information of the multi-carrier module at least includes power of a carrier, a working frequency point of the carrier, and a working frequency band of the multi-carrier module, and may further include a carrier number and a carrier frequency number and the like. The control information may be used by the resource pool module to calculate output power of a power amplifier of each multi-carrier module, and re-allocate carriers for multi-carrier modules.

Step 502: The resource pool module determines a carrier used by each multi-carrier module according to the control information, and notifies each multi-carrier module of determined information, where the determined information is the carrier used by each multi-carrier module.

This step is similar to step 202 in Embodiment 2, and the difference lies in that the resource pool module takes place of the main multi-carrier module to implement processing, and the resource pool module determines a carrier transmitted by each multi-carrier module; while in Embodiment 2, the main multi-carrier processing module not only determines the carrier transmitted by each secondary multi-carrier module, but also determines the carrier transmitted by itself.

For the detailed content of step 502, reference can be made to the description in Embodiment 2, and the details will not be repeated herein.

Step 503: Each multi-carrier module transmits the carrier according to the determined information.

This step is substantially the same as step 203 in Embodiment 2, and reference can be made to the description in Embodiment 2.

The resource pool module may implement calculation of related power and carrier allocation of the multi-carrier module several time slots, for example, two time slots ahead, and send the determined information to each multi-carrier module one time slot ahead. An intermediate radio frequency processing unit of each multi-carrier module acquires downstream data and control information of each carrier in a baseband data exchange unit of the each multi-carrier module, and modulates and outputs the downstream data of each carrier via a carrier according to the control information.

It can be seen from Embodiment 3 that, in the embodiment of the present invention, one resource pool module is uniformly set, and the resource pool module collects the carrier control information of each multi-carrier module in the cell, so as to calculate the output power of a power amplifier of each multi-carrier module according to the control information, and re-allocate carriers of multi-carrier modules, thereby enabling at least two multi-carrier modules to cooperatively implement carrier power sharing processing, and enhancing performance of a network. In addition, for a large-capacity multi-carrier base station, coverage of the base station may be expanded without increasing hardware cost, and network construction cost is reduced.

The carrier processing method is illustrated in detail in the foregoing embodiments of the present invention, and accordingly, embodiments of the present invention further provide a communication device and a communication system.

Figure 7:
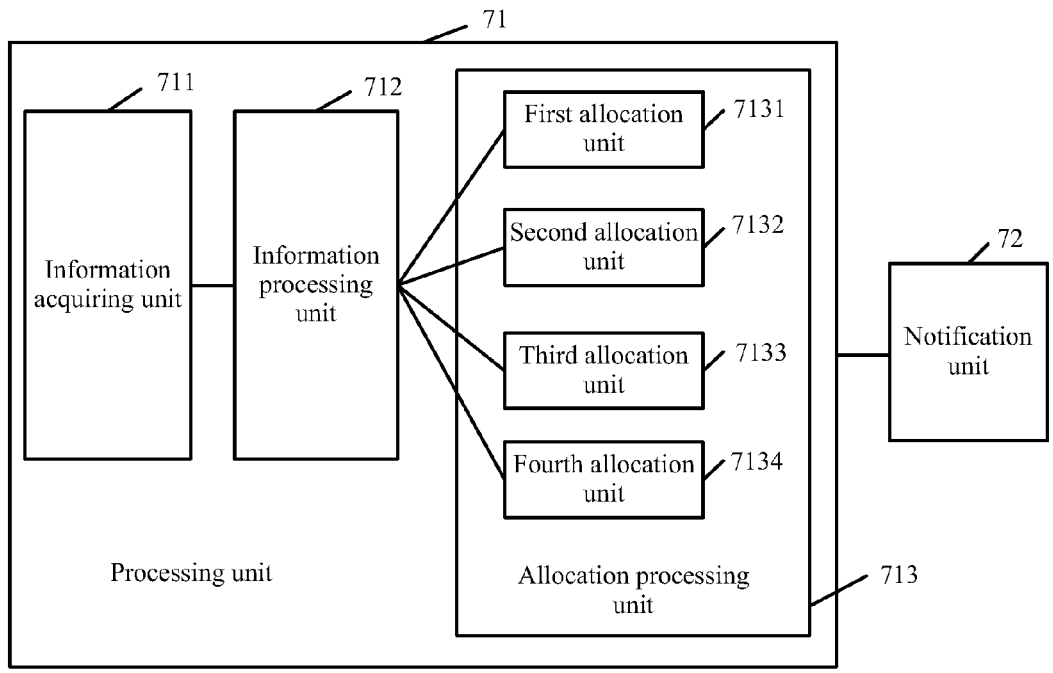
FIG. 7 is a schematic structural diagram of a communication device according to an embodiment of the present invention.

FIG. 7 is a schematic structural diagram of a communication device according to an embodiment of the present invention.

As shown in FIG. 7, the communication device includes a processing unit 71 and a notification unit 72. In this embodiment, the communication device may be a multi-carrier processing module, and the processing unit 71 and the notification unit 72 may belong to a baseband processing unit in the multi-carrier processing module. The communication device may also be a resource pool module independently set.

The processing unit 71 is configured to acquire control information of each of at least two multi-carrier modules associated with carriers; and according to the acquired control information, determine a carrier used by each multi-carrier module.

The notification unit 72 is configured to instruct each multi-carrier module to perform carrier power sharing processing according to the determined carrier.

The processing unit 71 includes an information acquiring unit 711, an information processing unit 712, and an allocation processing unit 713.

The information acquiring unit 711 is configured to acquire carrier control information of each multi-carrier module, where the carrier control information of the multi-carrier module includes: power of a carrier, a working frequency point of the carrier, and a working frequency band of the multi-carrier module.

The information processing unit 712 is configured to determine a carrier having a working frequency point in an intersection of working frequency bands of at least two multi-carrier modules as a shared carrier; and determine power of a single multi-carrier module and total power of all multi-carrier modules. The power of the single multi-carrier module may refer to total output power W2 of the multi-carrier module at a current time slot, and the total power of all the multi-carrier modules may refer to total output power of each multi-carrier module in the cell.

The allocation processing unit 713 is configured to determine, according to a determination result from the information processing unit 712, the carrier used by each multi-carrier module.

The allocation processing unit 713 includes a first allocation unit 7131. The first allocation unit 7131 is configured to, when the power of one of the at least two multi-carrier modules is greater than a first threshold, and the total power of all the multi-carrier modules is smaller than or equal to a second threshold, determine that a shared carrier in the multi-carrier module is transmitted by another multi-carrier module having remaining power.

Specifically, the first allocation unit 7131 determines that carrier channel shift is performed on the shared carrier in the multi-carrier module and a carrier having smaller output power in the another multi-carrier module having remaining power; or, determines that all or a part of shared carriers in the multi-carrier module are transmitted via an idle downstream carrier channel of the another multi-carrier module having remaining power.

The allocation processing unit 713 further includes a second allocation unit 7132.

The second allocation unit 7132 is configured to, when the power of one of the at least two multi-carrier modules is greater than the first threshold, and the total power of all the multi-carrier modules is smaller than or equal to the second threshold, determine that an exceeding part obtained through the power of the multi-carrier module minus the first threshold is provided by another multi-carrier module having remaining power.

The allocation processing unit 713 further includes a third allocation unit 7133.

The third allocation unit 7133 is configured to, when the power of one of the at least two multi-carrier modules is greater than the first threshold, and the total power of all the multi-carrier modules is greater than the second threshold, start peak clipping processing of the multi-carrier module.

The allocation processing unit 713 further includes a fourth allocation unit 7134.

The fourth allocation unit 7134 is configured to, when power of any one of the multi-carrier modules is smaller than or equal to the first threshold of the multi-carrier module, determine that each multi-carrier module transmits a carrier according to its own original control information.

Figure 8:
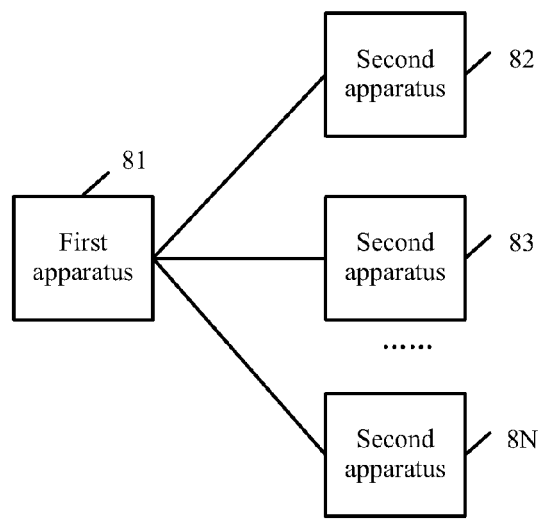
FIG. 8 is a schematic structural diagram of a communication system according to an embodiment of the present invention.

FIG. 8 is a schematic structural diagram of a communication system according to an embodiment of the present invention.

As shown in FIG. 8, the communication system includes a first apparatus 81 and second apparatuses 82 to 8N.

The first apparatus 81 is configured to acquire control information of each of at least two multi-carrier modules associated with carriers; and according to the acquired control information, determine a carrier used by each multi-carrier module.

The second apparatuses 82 to 8N are configured to perform downstream transmission according to the carrier determined by the first apparatus 81.

The first apparatus 81 is a multi-carrier module serving as a main multi-carrier module among the multi-carrier modules, and the second apparatus is one or more main carrier modules other than the main multi-carrier module.

Alternatively, the first apparatus 81 is a resource pool module other than the multi-carrier modules, and the second apparatus is one or more multi-carrier modules among the multi-carrier modules.

The first apparatus 81 may have the structure as shown in FIG. 7, and reference can be made to the description in FIG. 7.

It should be noted that, based on the same concept as the method embodiments of the present invention, for information exchange and implementation processes between units of the device and the system, reference can be made to the description of the method embodiments of the present invention, and the details will not be repeated herein.

In view of the above, in the embodiment of the present invention, the control information of each multi-carrier module associated with the carriers is acquired; according to the acquired control information, the carrier used by each multi-carrier module is determined; and each multi-carrier module performs processing according to the determined carrier, so that a method of enabling at least two multi-carrier modules to cooperatively implement carrier processing is provided.

It should be noted that, the communication system may be a base station, a GSM format is used above as an example for illustration, and other formats, for example, a code division multiple access (CDMA, Code Division Multiple Access) format may also be used.

Further, the method provided in the embodiments of the present invention may also be applied to other wireless multi-mode base stations, as long as output power and carrier working frequency of a power amplifier are pre-determined, and the wireless multi-mode base station may implement, according to transmission power requirements of carriers in the cell, transmission power scheduling and working carrier scheduling between multi-carrier modules that support multiple modes in the cell, so that optimal allocation is achieved on downstream services in the cell and the network performance is enhanced.

Persons of ordinary skill in the art should understand that all or a part of the steps of the method according to the embodiments of the present invention may be implemented by a program instructing relevant hardware. The program may be stored in a computer readable storage medium. The storage medium may be a read only memory (ROM, Read Only Memory), a random access memory (RAM, Random Access Memory), a magnetic disk, or an optical disk.

The carrier processing method, the communication device and the communication system provided by the embodiments of the present invention are described in detail above. The principle and implementation of the present invention are described herein through specific examples. The description about the embodiments of the present invention is merely provided for ease of understanding of the method and core ideas of the present invention. Persons of ordinary skill in the art can make variations and modifications to the present invention in terms of the specific implementations and application scopes according to the ideas of the present invention. Therefore, the content of the specification shall not be construed as a limit to the present invention.

What is claimed is:

1. A carrier processing method for a cell in a multi-carrier base station, the method comprising:
   acquiring control information of each of a plurality of multi-carrier modules associated with carriers;
   according to the control information, determining a determined carrier used by each of the multi-carrier modules; and
   performing, by each of the multi-carrier modules, carrier power sharing processing according to the determined carrier;
   wherein acquiring the control information comprises acquiring carrier control information of each multi-carrier module, wherein the carrier control information of the multi-carrier module comprises power of the carrier, a working frequency point of the carrier, and a working frequency band of the multi-carrier module; and
   wherein the carrier power sharing processing is performed at the same time slot for each of the multi-carrier modules.

2. The carrier processing method according to claim 1, wherein acquiring the control information comprises acquiring, by one of the multi-carrier modules that serves as a main multi-carrier module, the control information of each of the multi-carrier modules associated with the carriers.

3. The carrier processing method according to claim 1, wherein determining the carrier used by each of the multi-carrier modules comprises:
   determining power of each of the multi-carrier modules and total power of all of the multi-carrier modules; and
   when power of a first multi-carrier module of the multi-carrier modules is greater than a first threshold, and the total power of all of the multi-carrier modules is smaller than or equal to a second threshold, determining that a shared carrier in the first multi-carrier module is transmitted by a second multi-carrier module of the multi-carrier modules having remaining power, wherein the shared carrier is in an intersection of working frequency bands of the first multi-carrier module and the second multi-carrier module.

4. The carrier processing method according to claim 3, wherein determining that the shared carrier in the first multi-carrier module is transmitted by the second multi-carrier module having remaining power comprises determining that carrier channel shift is performed on the shared carrier in the first multi-carrier module and a carrier of the second multi-carrier module having remaining power.

5. The carrier processing method according to claim 3, further comprising:
   when the power of the first multi-carrier module is greater than the first threshold, and the total power of all the multi-carrier modules is greater than the second threshold, starting peak clipping processing of the first multi-carrier module.

6. The carrier processing method according to claim 3, further comprising:
   when power of any of the multi-carrier modules is smaller than or equal to the first threshold, determining that the any of the multi-carrier modules transmit a carrier according to the control information of its own carrier.

7. The carrier processing method according to claim 3, wherein performing the carrier power sharing processing according to the determined carrier comprises performing, by the first multi-carrier module, carrier channel shift on the shared carrier and the carrier of the second multi-carrier module having remaining power.

8. The carrier processing method according to claim 3, wherein determining that the shared carrier in the first multi-carrier module is transmitted by the second multi-carrier module having remaining power comprises determining that the shared carrier in the multi-carrier module is transmitted via an idle downstream carrier channel of the second multi-carrier module having remaining power.

9. The carrier processing method according to claim 3, wherein performing the carrier power sharing processing according to the determined carrier comprises transmitting, by the first multi-carrier module, the shared carrier via an idle downstream carrier channel of the second multi-carrier module having remaining power.

10. The carrier processing method according to claim 1, wherein acquiring the control information of each of the multi-carrier modules associated with the carriers comprises acquiring carrier control information of each of the multi-carrier modules, wherein the carrier control information comprises power of the carrier, a working frequency point of the carrier, and a working frequency band of the respective multi-carrier module; and
   wherein determining the carrier used by each of the multi-carrier modules comprises, when power of a first multi-carrier module of the multi-carrier modules is greater than a first threshold and total power of all of the multi-carrier modules is smaller than or equal to a second threshold, determining that an exceeding part obtained through the power of the first multi-carrier module minus the first threshold is provided by a second multi-carrier module of the multi-carrier modules having remaining power.

11. The carrier processing method according to claim 10, wherein performing the carrier power sharing processing according to the determined carrier comprises using, by the second multi-carrier module having remaining power, the exceeding part of the power to transmit a part or all of data transmitted by a multi-carrier module having transmission power greater than the first threshold.

12. The carrier processing method according to claim 1, wherein acquiring the control information comprises acquiring, by a resource pool module other than the multi-carrier modules, the control information of each of the multi-carrier modules associated with the carriers.

13. A communication device for a cell in a multi-carrier base station, the communication device comprising:
   a processing unit, configured to acquire control information of each of a plurality of multi-carrier modules associated with carriers and to determine a carrier used by each of the multi-carrier modules according to the acquired control information; and
   a notification unit, configured to instruct each of the multi-carrier modules to perform carrier power sharing processing according to the determined carrier;
   wherein the processing unit comprises an information acquiring unit, configured to acquire carrier control information of each multi-carrier module, wherein the carrier control information of the each multi-carrier module comprises power of a carrier, a working frequency point of the carrier, and a working frequency band of the multi-carrier module; and wherein the carrier power sharing processing is performed at the same time slot for each of the multi-carrier modules.

14. The communication device according to claim 13, wherein the processing unit comprises:

an information processing unit, configured to determine a carrier having a working frequency point in an intersection of working frequency bands of the multi-carrier modules as a shared carrier and determine power of a single multi-carrier module and total power of all of the multi-carrier modules; and an allocation processing unit, configured to determine, according to a determination result from the information processing unit, a carrier used by each of the multi-carrier modules.

15. The communication device according to claim 14, wherein the allocation processing unit comprises:

a first allocation unit, configured to, when power of a first multi-carrier module of the multi-carrier modules is greater than a first threshold, and the total power of all of the multi-carrier modules is smaller than or equal to a second threshold, determine that the shared carrier in the first multi-carrier module is transmitted by a second multi-carrier module having remaining power.

16. The communication device according to claim 15, wherein the allocation processing unit further comprises:

a second allocation unit, configured to, when the power of the first multi-carrier module of the multi-carrier modules is greater than the first threshold, and the total power of all the multi-carrier modules is smaller than or equal to the second threshold, determine that an exceeding part obtained through the power of the first multi-carrier module minus the first threshold is provided by the second multi-carrier module having remaining power.

17. The communication device according to claim 15, wherein the allocation processing unit further comprises:

a third allocation unit, configured to, when the power of the first multi-carrier module of the multi-carrier modules is greater than the first threshold, and the total power of all the multi-carrier modules is greater than the second threshold, start peak clipping processing of the first multi-carrier module.

18. The communication device according to claim 15, wherein the allocation processing unit further comprises:

a fourth allocation unit, configured to, when power of any of the multi-carrier modules is smaller than or equal to the first threshold of the any of the multi-carrier modules, determine that each of the multi-carrier modules transmits a carrier according to its own original control information.

\* \* \* \* \*